United States Patent [19]
Mathé et al.

[11] Patent Number: 6,141,414
[45] Date of Patent: Oct. 31, 2000

[54] DATA ACCESS ARRANGEMENT HAVING COMBINED REMOTE HANG-UP/RING DETECTION CIRCUITRY

[75] Inventors: Jacques Mathé, Penvenan; Daniel Jean Pater, Chateau Neuf de Grasse; Wilfrid C. D'Angelo, La Trinité, all of France

[73] Assignee: Conexant Systems, Inc., Newport Beach, Calif.

[21] Appl. No.: 09/074,896

[22] Filed: May 8, 1998

[51] Int. Cl.[7] .................................................. H04M 11/00
[52] U.S. Cl. .......................... 379/399; 379/412; 379/377; 379/382; 379/93.05
[58] Field of Search ................................. 379/377, 379, 379/382, 93.05, 399, 412

[56] References Cited

U.S. PATENT DOCUMENTS 5,600,715 2/1997 Bingel .
5,654,984 8/1997 Hershbarger et al. .

Primary Examiner—Stella Woo
Attorney, Agent, or Firm—Price and Gess

[57] ABSTRACT

A data access arrangement (DAA) for interfacing a modem with a telephone line which requires only one safety barrier device for providing electrical isolation of the modem from the telephone line for both a ring detection signal and a remote device hang-up detection signal transmitted from the DAA to the modem. The DAA utilizes the same combined circuitry to transmit both the ring detection signal and the hang-up detection signal to the modem. The single safety barrier device is selectively connected to either ring detection circuitry during an On-Hook mode or remote hang-up detection circuitry during an Off-Hook mode by a selectively operating a relay switching device. With this arrangement, an improved DAA is provided having a combined circuit configuration for communicating ring detection information to the modem during the On-Hook phase and communicating remote hang-up detection information to the modem during an Off Hook phase, thus minimizing the size, cost, and complexity of the DAA.

22 Claims, 2 Drawing Sheets

DATA ACCESS ARRANGEMENT HAVING COMBINED REMOTE HANG-UP/RING DETECTION CIRCUITRY

BACKGROUND OF THE INVENTION

1. Field of the Invention

The present invention relates generally to an improved data access arrangement interfacing a modem with a telephone line, and specifically to a data access arrangement having a combined circuit configuration for performing both remote hang-up detection and ring detection.

2. Description of Related Art

In order to transmit digital data between computers over the public switched telephone network (PSTN), modems are used to convert between a computer's digital signals and analog signals that can be carried on the telephone network's analog transmission lines. The subscriber portion of the telephone network (PSTN) has two wires known as "tip" and "ring," which carry information being transferred to and from the subscribers, as well as control signals, such as a ring signal. The modem receives a serial stream of bits as input from a computer and produces a modulated carrier as output, thus converting the digital signals of the computer to analog signals for transmission on the telephone wires. Because modems connect to these conventional telephone wires, they must conform to the requirements of the telephone network (PSTN). A data access arrangement (DAA) is connected as an interface between the modem and the telephone network (PSTN) to ensure the modem is compatible with the telephone network (PSTN).

Telephone companies require that a DAA be placed in series between the telephone wires and all equipment, such as modems, connected to the telephone network (PSTN) in order to isolate the equipment from the telephone network (PSTN). A DAA typically provides this electrical isolation between modems and the telephone network (PSTN), as well as providing impedance matching, hybrid circuit and sometimes amplification, filtering and control functions. DAAs commonly utilize transformers or optical couplers as safety components to provide such electrical isolation.

All equipment connected to the telephone network (PSTN) is either in an On Hook mode or Off Hook mode. During the On Hook phase, the equipment is not connected to other remote equipment through the telephone network (PSTN), and the equipment is awaiting a ring signal from a central office of the telephone network (PSTN). The DAA includes a ring detection circuit in order to detect when a ring signal is transmitted along the telephone wires, where the DAA then notifies the connected modem of the detected ring signal. During the Off Hook phase, the equipment is connected to the central office of the telephone network (PSTN) for the purpose of establishing a connection with other remote equipment. A DAA may also include a DC detection circuit which monitors the DC current on the telephone line to detect when a remote device discontinues its connection with the telephone line (e.g., hangs-up). The DAA then informs the connected modem of the remote device hang-up, so that the connected modem knows that the previous connection has been terminated and the modem can now establish a connection with another remote device. Since both the ring detection circuit and the DC detection circuit provide a connection between the modem and the telephone network (PSTN), safety barriers, such as transformers or optical couplers, must be respectively positioned in series between each circuit and the modem to provide electrical isolation for all electrical pathways between the telephone network (PSTN) and the modem. Thus, current DAAs each include two safety barriers, one for the ring detection circuit and another one for the DC detection circuit. In manufacturing DAAs, approximately 50% of the cost of producing a DAA comes from the cost of the safety barriers themselves.

There is a need for an improved DAA which utilizes a single safety barrier for providing electrical isolation between a modem and the telephone network (PSTN) for signals transmitted to the modem indicating both ring detection and remote hang-up detection in order to significantly reduce the cost, complexity, and size of the DAA.

SUMMARY OF THE INVENTION

The present invention overcomes the aforementioned shortcomings associated with the prior art by providing a data access arrangement for interfacing a modem with a telephone line which requires only one safety barrier device to provide electrical isolation of the modem from the telephone line for both a ring detection signal and a remote device hang-up detection signal transmitted to the modem.

The data access arrangement of the present invention interfaces a modem with a telephone line using the same circuitry to transmit ring detection information from the telephone line to the modem as well as to transmit remote device hang-up detection information to the modem. The single safety barrier device is selectively connected to either the ring detection circuitry during an On-Hook mode or the remote hang-up detection circuitry during an Off-Hook mode by a selectively operating a relay switching device. With this arrangement, an improved DAA is provided having a combined circuit configuration for communicating ring detection information to the modem during the On-Hook phase and communicating remote hang-up detection information to the modem during an Off Hook phase, thus minimizing the size, cost, and complexity of the DAA.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a data access arrangement (DAA) having a combined circuit configuration for performing both ring detection and remote hang-up detection.

Figure 1:
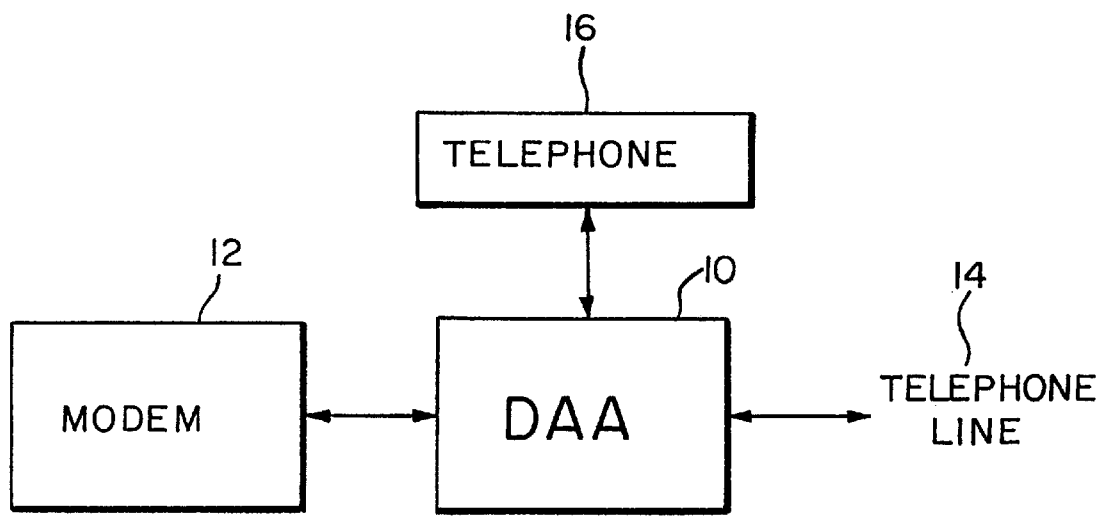
FIG. 1 is a block schematic diagram of a DAA showing its interface between a modem and a telephone line.

Referring now to FIG. 1, a block schematic diagram of a DAA 10 interfacing a modem 12 to the "tip" and "ring"

wires of a telephone line 14 is illustrated. It should be understood that the term modem is used herein to encompass modems, facsimile machines, answering machines and other similar telecommunication devices which require an interface to communicate information over a telephone line 14. The DAA 10 further includes the capability for connecting an ordinary voice telephone 16 to the telephone line 14.

Figure 2:
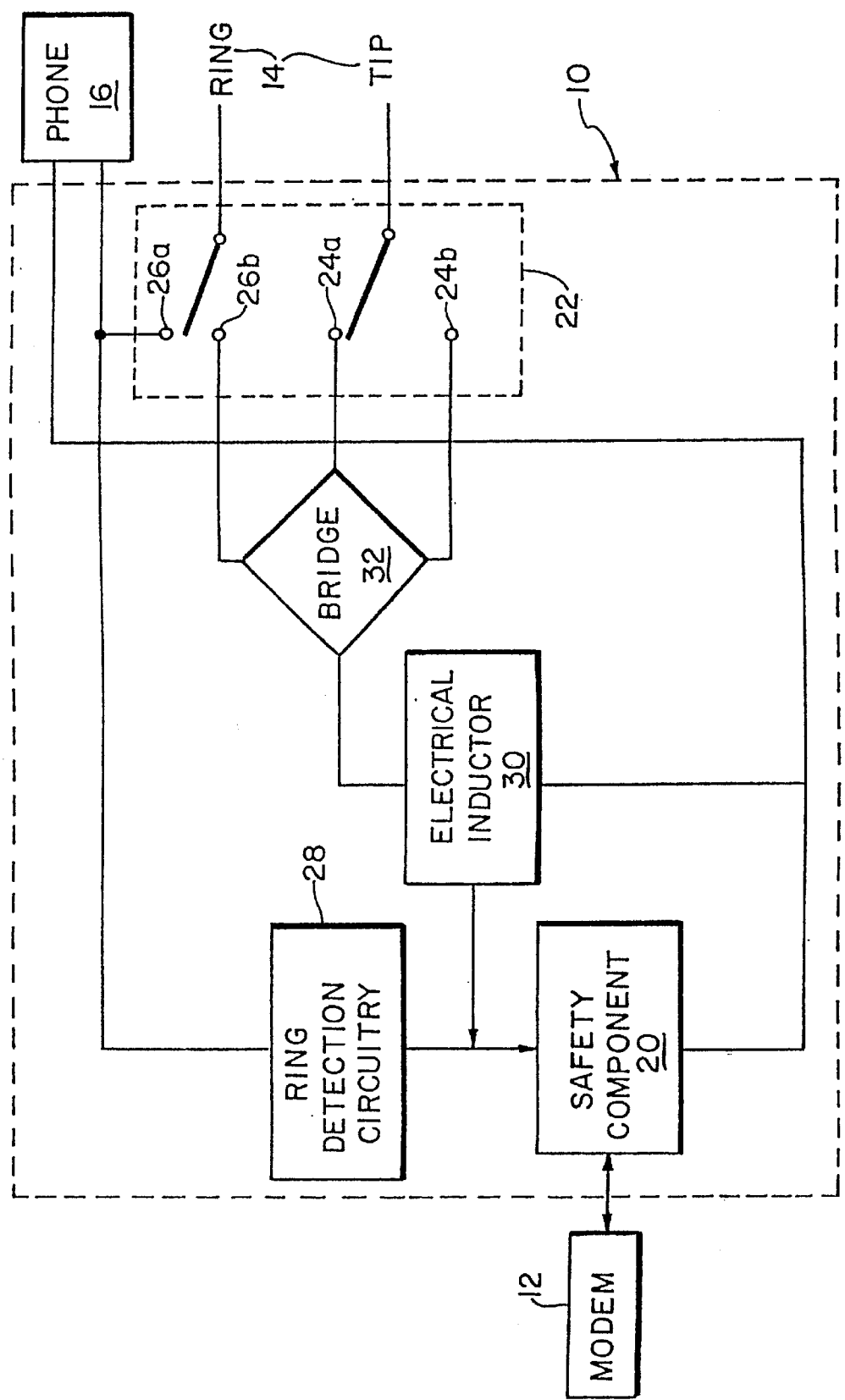
FIG. 2 is a block schematic diagram of a preferred embodiment of the DAA of the present invention.

The structure and operation of the DAA 10 of the present invention is described in greater detail with reference to the schematic block diagram of the DAA 10 in FIG. 2. The modem 12 is connected to the DAA 10 through a safety component 20. The safety component 20 provides electrical barrier isolation as well as communication between the modem 12 and the DAA 10. The safety component 20 preferably comprises an optical coupler, and will be referred to hereinafter as optical coupler 20. However, it is understood that safety component 20 may also comprise a transformer or other similar device providing the required electrical isolation between the modem 12 and the telephone line 14. The DAA 10 of the present invention is advantageous over prior DAA structures in that it only requires a single optical coupler 20 to transmit both ring detection signals and remote hang-up detection signals to the modem 12.

The modem 12 will either be in an On-Hook mode or an Off-Hook mode. The modem 12 is Off-Hook while it has established a connection with a remote modem (not shown) connected to the telephone network (PSTN), and the modem 12 is On-Hook while it is awaiting a ring signal to be transmitted from a remote modem. The DAA 10 includes a relay 22 which switches the connection of the DAA 10 to the tip and ring wires of the telephone line 14 between the On-Hook mode and the Off-Hook mode. Relay 22 may comprise any type of multiple-contact switch that allows its connection between the contacts to be easily switched, such as handset exclude switch. While in the On-Hook mode, relay 22 connects the tip/ring wires 14 to contacts 24a and 26a, respectively, to connect ring circuitry 28 to the telephone line 14. The DAA 10 can then detect the incoming ring signal by processing the ring voltage appearing across the tip/ring wires 14 using ring circuitry 28. Ring detection information is output by ring circuitry 28 to optical coupler 20, where optical coupler 20 then transmits the ring detection information to the modem 12.

While in the Off-Hook mode, relay 22 connects the tip/ring wires 14 to contacts 24b and 26b, respectively, to connect an electrical inductor 30 to the telephone line 14. In the Off-Hook mode, the modem 12 is connected through the telephone line 14 to a remote modem (not shown). The DAA 10 is powered from the DC current flowing through the telephone line 14 from the telephone network (PSTN). The DC current flows through electrical inductor 30 where it is regulated and returned to the telephone network (PSTN) through the telephone line 14. The electrical inductor 30 performs DC current detection to monitor the DC current on the telephone line 14 in order to detect when the remote modem breaks its connection (i.e. hangs-up) with the telephone line 14. When the remote modem hangs-up, a sudden drop in the DC current on the telephone line 14 occurs. The electrical inductor 30 detects this change in the DC current on the telephone line and transmits a remote hang-up detection signal to optical coupler 20. Optical coupler 20 then transmits the remote hang-up detection signal to the modem 12, so that the modem 12 is aware that it is free to establish a connection with another remote modem.

Furthermore, electrical inductor 30 also detects when the DAA 10 has been disconnected from the telephone line 14 (i.e., removed from the telephone jack). When disconnected from the telephone line 14, no current will flow through electrical inductor 30, and the electrical inductor 30 will detect that no DC current is flowing from the telephone line 14 through the electrical inductor 30. Electrical inductor 30 will then provide a disconnection detection signal to optical coupler 20, which, in turn, transmits the disconnection detection signal to the modem 12, so that the modem 12 is aware that the DAA 10 has been disconnected from the telephone line 14. It is understood that other similar devices for performing DC current detection can be utilized in place of the electrical inductor 30.

A diode bridge 32 is positioned between the telephone line 14 and the electrical inductor 30 in order to full wave rectify the incoming signal from the telephone line 14. The inputs to the diode bridge 32 are connected to contacts 24b and 26b of relay 22, so that the diode bridge 32 is only connected to the telephone line 14 when the DAA is operating in the Off-Hook mode. While in the On-Hook mode, the incoming ring signal passes directly to ring circuitry 28 without requiring full wave rectification.

By forming the DAA 10 according to the above novel configuration, the outputs of both ring circuitry 28 and electrical inductor 30 are passed through only a single optical coupler 20 for transmission to the modem 12. Thus, only one electrical isolation barrier between the modem 12 and DAA 10 is required to transmit both ring detection information and remote device hang-up information from the DAA 10 to the modem 12.

As can be seen from the foregoing, a DAA formed in accordance with the present invention allows a single electrical isolation barrier device to be positioned between a modem and the ring detection circuitry and remote device hang-up detection circuitry of the DAA. Moreover, by forming a DAA having combined ring detection/remote device hang-up detection circuitry in accordance with the present invention, the cost, size, and complexity of the DAA can be significantly reduced by reducing the number of electrical isolation barrier devices required to be positioned between the DAA and a modem.

In each of the above embodiments, the schematic illustration of the DAA having combined ring detection/remote device hang-up detection circuitry of the present invention is described for a preferred embodiment of the DAA. However, it is the full intention of the inventors of the present invention that the DAA may be configured in other possible arrangements where the output from both the ring detection circuitry and remote device hang-up detection circuitry are passed through a single electrical isolation barrier when transmitted to a connected modem. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A data access arrangement for interfacing a data communications device with a communication line and electrically isolating the data communications device from the communication line, comprising:

an interface for connecting the data access arrangement to the communication line;

a ring detection device connected to the interface for detecting when a ring signal is transmitted over the communication line and outputting a ring detection signal;

a remote hang-up detection device connected to the interface for detecting when a remote data communications device connected to the data access arrangement through the communication line breaks its connection from the communication line and outputting a remote hang-up detection signal; and an isolation device connected in a signal pathway between the data communications device and the outputs of both the ring detection device and the remote hang-up detection device for providing electrical barrier isolation between the data communication device and the communication line.

2. The data access arrangement of claim 1, wherein the isolation device is further configured for receiving the ring detection signal and the remote hang-up detection signal and for transmitting these signals to the data communication device.

3. The data access arrangement of claim 1, wherein the interface connecting the data access arrangement to the communication line includes a switching device for selectively switching the connection of the communication line between the ring detection device and the remote hang-up detection device.

4. The data access arrangement of claim 3, wherein a DC current signal flows from the communication line and through the remote hang-up detection device, the remote hang-up detection device monitoring changes in the DC current signal to detect when the remote data communication device breaks its connection with the communication line.

5. The data access arrangement of claim 4, further comprising a rectifying device positioned between the switching device and the remote hang-up detection device for performing full wave rectification of the DC current signal transmitted from the communication line.

6. The data access arrangement of claim 4, wherein the remote hang-up detection device further detects whether the data access arrangement has been disconnected from the communication line by detecting when zero DC current is flowing through the remote hang-up detection device.

7. The data access arrangement of claim 1, wherein the remote hang-up detection device comprises an electrical inductor.

8. The data access arrangement of claim 1, wherein the isolation device comprises a single optical coupler.

9. A data access arrangement for interfacing a data communications device with a communication line and electrically isolating the data communications device from the communication line, the communication line having a DC current signal flowing there through, comprising:

an interface for connecting the data access arrangement to the communication line;

a ring detection device connected to the interface for detecting when a ring signal is transmitted over the communication line and outputting a ring detection signal;

a DC detection device to the interface for monitoring the DC current signal flowing from the communication line in order to detect changes in the communication abilities of the data communication device and outputting a communication state detection signal; and a single isolation device positioned to receive both the ring detection signal and the communication state detection signal in a signal pathway between the data communications device and the outputs of both the ring detection device and the DC detection device, wherein the isolation device provides electrical barrier isolation between the data communication device and the communication line.

10. The data access arrangement of claim 9, wherein the communication state detection signal contains information indicating that the DC detection device has detected that a remote data communications device connected to the data access arrangement through the communication line has broken its connection from the communication line.

11. The data access arrangement of claim 9, wherein the communication state detection signal contains information indicating that the DC detection device has detected that the data access arrangement has been disconnected from the communication line.

12. The data access arrangement of claim 9, wherein the interface connecting the data access arrangement to the communication line includes a switching device for selectively switching the connection of the communication line between the ring detection device and the DC detection device.

13. The data access arrangement of claim 12, further comprising a rectifying device positioned between the switching device and the DC detection device for performing full wave rectification of the DC current signal transmitted from the communication line.

14. The data access arrangement of claim 9, wherein the DC detection device comprises an electrical inductor.

15. The data access arrangement of claim 9, wherein the isolation device comprises a single optical coupler.

16. A method for configuring a data access arrangement for interfacing a data communication device with a communication line using only a single isolation barrier for electrically isolating the data communication device from the communication line, comprising the steps of:

providing a switching device connectable to the communication line for operatively switching the data access arrangement between an On-Hook mode and an Off-Hook mode;

operatively connecting a ring detection device to receive signals traveling from the communication line when the data access arrangement is operating in the On-Hook mode;

outputting a ring detection signal to the single isolation barrier when the ring detection device detects that a ring signal has been transmitted over the communication line;

operatively connecting a remote hang-up detection device to receive signal traveling from the communication line when the data access arrangement is operating in the Off-Hook mode; and outputting a remote hang-up detection signal to the single isolation barier when the remote hang-up detection device detects that a remote data communication device connected to the data access arrangement through the communication line has broken its connection with the communication line.

17. The method of configuring a data access arrangement of claim 16, further comprising the step of passing both the ring detection signal and the remote hang-up detection signal through a single isolation barrier providing electrically isolation between the data communication device and the communication line and transmitting the signals to the data communication device.

18. The method of configuring a data access arrangement of claim 16, further comprising the step of positioning a rectifying device between the switching device and the remote hang-up detection device for performing full wave rectification of the signals transmitted from the communication line while the data access arrangement is operating in the Off-Hook mode.

19. The method of configuring a data access arrangement of claim 16, the remote hang-up detection device detects that a remote data communications device has broken its connection from the communication line by monitoring changes in a DC current flowing through the communication line.

20. The method of configuring a data access arrangement of claim 16, further comprising the steps of:

detecting whether the data access arrangement has been disconnected from the communication line and outputting a disconnection detection signal to the single isolation barrier when disconnection is found; and transmitting the disconnection detection signal from the single isolation barrier to the data communication device.

21. The method of configuring a data access arrangement of claim 16, wherein the remote hang-up detection device comprises an electrical inductor.

22. The method of configuring a data access arrangement of claim 16, wherein the single isolation barrier comprises an optical coupler.

* * * * *